(12) United States Patent
Saleh

(10) Patent No.: US 12,458,929 B2
(45) Date of Patent: Nov. 4, 2025

(54) SYNTHESIS OF GRAPHENE-MODIFIED POLYURETHANE FOAM MEMBRANE FOR SEPARATING WATER FROM AN OIL-WATER MIXTURE

(71) Applicant: KING FAHD UNIVERSITY OF PETROLEUM AND MINERALS, Dhahran (SA)

(72) Inventor: Tawfik Abdo Saleh, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 447 days.

(21) Appl. No.: 18/312,304

(22) Filed: May 4, 2023

(65) Prior Publication Data

US 2024/0367111 A1    Nov. 7, 2024

(51) Int. Cl.
*B01D 67/00* (2006.01)
*B01D 61/24* (2006.01)
(Continued)

(52) U.S. Cl.
CPC ....... *B01D 67/0079* (2013.01); *B01D 61/246* (2013.01); *B01D 69/02* (2013.01); *B01D 71/024* (2013.01); *B01D 71/54* (2013.01); *B01J 20/205* (2013.01); *B01J 20/265* (2013.01); *B01J 20/28045* (2013.01); *B01J 20/28085* (2013.01); *B01J 20/3085* (2013.01);
(Continued)

(58) Field of Classification Search
None
See application file for complete search history.

(56) References Cited

U.S. PATENT DOCUMENTS

| 11,613,479 B2 * | 3/2023 | Awadh | B01J 20/324 |
| | | | 210/671 |
| 2020/0384422 A1 | 12/2020 | Liu | |

FOREIGN PATENT DOCUMENTS

| CN | 103623709 B | 7/2015 | |
| CN | 111019189 A * | 4/2020 | C08J 9/36 |

(Continued)

OTHER PUBLICATIONS

Lía Vásquez, et al., "Expanded Graphite-Polyurethane Foams for Water-Oil Filtration", ACS Applied Materials & Interfaces, vol. 11, Issue 33, Aug. 7, 2019, pp. 30207-30217 (Abstract only).
(Continued)

*Primary Examiner* — Magali P Slawski
*Assistant Examiner* — Eric J Mccullough
(74) *Attorney, Agent, or Firm* — Oblon, McClelland, Maier & Neustadt, L.L.P.

(57) ABSTRACT

A method for synthesizing a hydrophilic graphene-modified polyurethane foam membrane, is described. The method includes functionalizing graphene oxide particles with tartronic acid to form a functionalized product having a hydrophilic functional group; and reacting the functionalized product with a polyurethane to form the hydrophilic graphene-modified polyurethane foam membrane. The hydrophilic graphene-modified polyurethane foam membrane has a water adsorption capacity of at least 20 g/g. The hydrophilic graphene-modified polyurethane foam membrane is adapted for a use selected from the use group consisting of oil and water separation, water treatment, desalination, and pharmaceutical filtration.

20 Claims, 11 Drawing Sheets

(51) Int. Cl.
- *B01D 69/02* (2006.01)
- *B01D 71/02* (2006.01)
- *B01D 71/54* (2006.01)
- *B01J 20/20* (2006.01)
- *B01J 20/26* (2006.01)
- *B01J 20/28* (2006.01)
- *B01J 20/30* (2006.01)

(52) U.S. Cl.
CPC .... *B01D 2323/02* (2013.01); *B01D 2323/081* (2022.08); *B01D 2323/12* (2013.01); *B01D 2323/36* (2013.01); *B01D 2325/20* (2013.01); *B01D 2325/36* (2013.01)

(56) References Cited

FOREIGN PATENT DOCUMENTS

| | | |
|---|---|---|
| CN | 112745476 B | 9/2022 |
| CN | 112516813 B | 10/2022 |
| JP | 6636861 B2 | 1/2020 |

OTHER PUBLICATIONS

Abimannan Sethurajaperumal, et al., "High-Quality and Efficient Liquid-Phase Exfoliation of Few-Layered Graphene by Natural Surfactant", ACS Sustainable Chemistry & Engineering, vol. 10, Issue 45, Nov. 1, 2022, pp. 14746-14760 (Abstract only).

* cited by examiner

SYNTHESIS OF GRAPHENE-MODIFIED POLYURETHANE FOAM MEMBRANE FOR SEPARATING WATER FROM AN OIL-WATER MIXTURE

BACKGROUND

Technical Field

The present disclosure is directed to a membrane, particularly a graphene-modified polyurethane foam membrane for separating water from an oil-water mixture, and a method for separating an oil-water mixture.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Oil-water mixes created by routine and industrial activities have seriously polluted the environment and wasted precious resources. For example, small amounts of water in fuel can condense on the metal surface of an engine, resulting in corrosion, significantly shortening the engine's lifespan and raising the likelihood of failure. Certain other problems with the water-oil mixes include nozzle and filter clogging, plunger seizure, and increased mechanical wear of injection pumps and injectors. Water also contributes to the oxidation of petroleum products and the development of bio-contaminants in fuel. The presence of a small amount of water may cause rapid growth of microorganisms due to water, carbon, nitrogen, and mineral nutrition. The bottom of the tank may be covered in microbial sludge, creating areas vulnerable to localized corrosion attacks.

Water commonly enters fuels through precipitation, humidity, and condensation of air moisture. Fuels contain water in three states: free, emulsified, and dissolved water. The separation of oil-water mixtures has piqued the curiosity of engineers and scientists worldwide. Conventional methods of separating oil-water mixtures, such as gravity-driven filtration, combustion, air flotation, biodegradation, and electrochemical approaches, suffer from drawbacks due to their time-consuming operation (since wastewater is pre-collected), insufficient oil separation, and traditional technologies for oil separation. Conventional methods of separating oil-water mixtures cannot easily satisfy the current demand. Although a few ecologically friendly techniques including filters, coalescence separation, absorption bioremediation, and magnetic separation technology, have been developed in the past, there still exists a need for developing alternate methods for effective oil-water separation.

Therefore, there is a need for improved methods for filtration and water-oil separation. Accordingly, it is one object of the present disclosure is to provide a method for making a membrane for oil-water separation, and a method for separating oil-water mixtures using the membrane.

SUMMARY

In an exemplary embodiment, a method for synthesizing a hydrophilic graphene-modified polyurethane foam membrane, is described. The method includes functionalizing graphene oxide particles with tartronic acid to form a functionalized product having a hydrophilic functional group; and reacting the functionalized product with a polyurethane to form the hydrophilic graphene-modified polyurethane foam membrane. The hydrophilic graphene-modified polyurethane foam membrane has a water adsorption capacity of at least 20 g/g.

In some embodiments, functionalizing graphene oxide particles with tartronic acid includes sonicating graphene oxide in an alcohol/water mixture to form a first reaction mixture; mixing tartronic acid with the first reaction mixture and sonicating to form a second reaction mixture; adding a carbodiimide catalyst to the second reaction mixture and sonicating to form a third reaction mixture comprising the functionalized product; centrifuging the third reaction mixture to collect the functionalized product; and drying the functionalized product.

In some embodiments, the method includes sonicating the first reaction mixture for at least two hours to form a second reaction mixture.

In some embodiments, the carbodiimide is N,N'-dicyclohexylcarbodiimide.

In some embodiments, the method includes drying the functionalized product for at least twenty-four hours at 60° C. under a vacuum.

In some embodiments, the method includes reacting the functionalized product with polyurethane including the steps of mixing the functionalized product with the polyurethane in a polar protic solvent to form a mixture; sonicating the mixture; refluxing the mixture; and drying the mixture to form the hydrophilic graphene-modified polyurethane foam membrane.

In some embodiments, the ratio of mixing the functionalized product with the polyurethane is in the range of 1:2 to 1:5 by weight.

In some embodiments, the method includes synthesizing the graphene oxide particles by oxidizing a waste graphite powder, where at least 95% by weight of the graphite in the graphene oxide particles is from the waste graphite powder.

In some embodiments, the graphene oxide particles include epoxy functional groups, hydroxyl functional groups, and carboxyl functional groups.

In some embodiments, the graphene oxide particles include one or more carboxyl functional groups that are covalently bonded to one or more hydroxyl groups of the tartronic acid.

In some embodiments, the functionalized product has a nanosheet structure.

In some embodiments, one or more carbon atoms in the graphene oxide in the functionalized product is bonded covalently to one or more amides in the polyurethane.

In some embodiments, the hydrophilic graphene-modified polyurethane foam membrane has a porous morphology with pores ranging in size from 100 micrometers to 800 micrometers in diameter.

In some embodiments, the hydrophilic graphene-modified polyurethane foam membrane has an oil contact angle from 145° to 160°.

In some embodiments, the method further includes contacting the hydrophilic graphene-modified polyurethane foam membrane with an oil-water mixture to permeate the water from the oil-water mixture through the hydrophilic graphene-modified polyurethane foam membrane and block the oil from the oil-water mixture from permeating through the hydrophilic graphene-modified polyurethane foam membrane.

In some embodiments, the method of contacting the hydrophilic graphene-modified polyurethane foam membrane with the oil-water mixture results in a separation efficiency of oil and water of at least 96%.

In some embodiments, the method of contacting the hydrophilic graphene-modified polyurethane foam membrane with the oil-water mixture results in a flux from 30,925 liters per square meter per hour (L m$^{-2}$ h$^{-1}$) to 30,500 L m$^{-2}$ h$^{-1}$ in a range of 1 to 50 cycles.

In some embodiments, the method further includes wetting the hydrophilic graphene-modified polyurethane foam membrane with water before contacting the hydrophilic graphene-modified polyurethane foam membrane with the oil-water mixture.

In some embodiments, the oil in the oil-water mixture is one or more of toluene, cyclohexane, n-hexane, dichloromethane, and waste oil.

In some embodiments, the hydrophilic graphene-modified polyurethane foam membrane is adapted for a use selected from the use group consisting of oil and water separation, water treatment, desalination, and pharmaceutical filtration.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
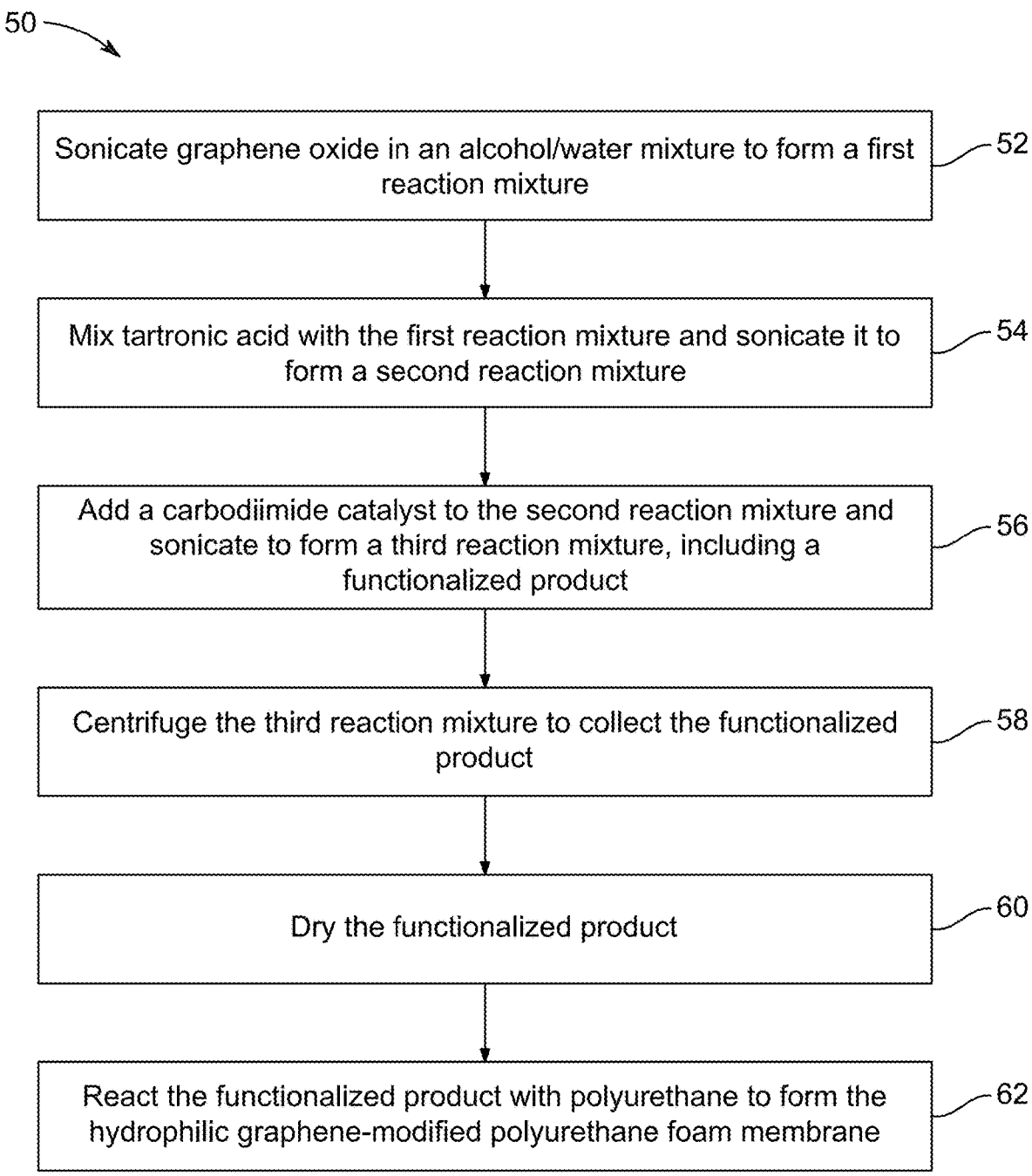
FIG. 1 is a flow chart depicting a method of preparing a hydrophilic graphene-modified polyurethane foam (GMF) membrane, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a superhydrophilic graphene-modified polyurethane foam (GMF) membrane for efficient oil-water separation. The GMF membrane comprises a modified graphene oxide layer bonded to a polyurethane foam. A method for oil-water separation includes the GMF membrane. In one aspect, this method involves functionalizing graphene oxide with a hydrophilic functional group to form modified graphene oxide particles and reacting the modified graphene oxide particles with the polyurethane foam to form the GMF membrane. The method may further include synthesis of graphene oxide (GO) from waste graphite before functionalizing graphene oxide with a hydrophilic functional group to form modified graphene oxide particles and reacting the modified graphene oxide particles with the polyurethane foam to form the GMF membrane. The prepared GMF was fully characterized by scanning electron microscopy (SEM) and Fourier transform infrared spectroscopy (FTIR) and was further evaluated for its potential in separating various oils (toluene, cyclohexane, n-hexane, dichloromethane, and waste oil) from an oil-water mixture. The results indicate that the GMF membrane exhibits a high adsorption capacity and separation efficiency for all the tested oils in an efficient manner.

According to one aspect of the present disclosure, a method of synthesis of graphene oxide (GO) is described. Generally, graphite powder is the primary precursor for graphene oxide synthesis. Graphite is found in nature in three forms, namely, amorphous (70-80%), crystalline flakes (90-98%), and crystalline lumps or veins (90-99%). Graphite is found in metamorphic rocks, igneous rocks, and meteorites. Graphite may be mined from the ground. In some embodiments, graphite may be prepared synthetically from silicon carbide. In some embodiments, the source of graphite for making the graphene oxide is industrial waste. Industries, such as welding, battery, automative, art, and textile industries, are usually the primary sources which use graphite. Typically, the graphite produced from such industries is treated by physical and chemical processes to separate graphite from other metals and minerals, which is expensive. The present disclosure may utilize the graphite from industrial waste (also called waste graphite) to a value-added product (graphene oxide) via a modified Hummers' method. In some embodiments, graphite from natural sources, such as metamorphic rocks such as marble, schist, and gneiss, may be used alone or in combination with the waste graphite to synthesize the graphene oxide. In a preferred embodiment, at least 95%, preferably 96%, more preferably 97%, more preferably 98%, more preferably 99%, and yet more preferably 100% by weight of the graphite in the graphene oxide particles is from the waste graphite. Waste graphite may be recycled and recovered from synthetic graphite electrodes, lathe turnings, graphite-containing refractories, graphite-containing crucibles, carbon-magnesite brick, steelmaking kish, and the like. The graphite of the present disclosure may be in the shape of a fine powder, powder, granules, scales, polyhedrons, rods, curved surfaces, and the like. In a preferred embodiment, the graphite is in the form of a powder.

Graphite is a crystalline form of carbon comprising planar stacked layers of carbon atoms with a hexagonal crystal structure. The carbon atoms within a layered sheet are covalently bonded to other carbon atoms within the same layered sheet in an sp$^2$ hybridized manner. A single layered sheet of carbon atoms in the graphite is graphene. Graphite may comprise about ten to hundreds of thousands of layers of graphene. Graphite may be in the form of layers of $sp^2$ hybridized trigonal planar carbon. The bond length between the $sp^2$ hybridized trigonal planar carbon is about 0.142 nanometers. Each layer of trigonal planar carbon is arranged in a honeycomb and hexagonal lattice. The layers of graphene in the graphite are separated by about 0.335 nanometers. The carbon atoms in the layers of graphene in the graphite experience Van der Waals forces with other carbon atoms in the adjacent layers of graphene in the graphite.

There are two forms of graphite, alpha and beta. Alpha graphite is also know as hexagonal graphite. The layers of graphene in alpha graphite are stacked in a repeating order of first layer, second layer, first layer, second layer, and so on repeating. Beta graphite is also known as rhombohedral graphite. The layers of graphene in beta graphite are stacked in a repeating order of first layer, second layer, third layer, and so on repeating. In a preferred embodiment, the graphite is alpha graphite.

In some embodiments, the conversion of graphite found in nature or waste graphite involves graphite powder as the primary precursor for graphene oxide synthesis with graphite oxide as an intermediate. The conversion of graphite to graphite oxide, and subsequently to graphene oxide, can be performed by any of the methods including a chemical and thermal treatment conventionally known in the art, such as Brodie's method, Staudenmaier's method, Hofmann's method, Hummers' method, Tour's method, modified Hummers' method, etc. The conversion of graphite to graphite oxide involves the oxidation of graphite, introducing molecules of oxygen to the pure carbon of a graphene layer of the graphite.

Graphene oxide may be synthesized from graphene. In a preferred embodiment, the graphene oxide particles are produced from waste graphite by modified Hummers' method. Converting waste graphite to graphene oxide particles may involve these steps:

(i) Oxidizing graphite to graphite oxide (GTO): This is done by mixing the graphite powder, preferably waste graphite, in a solution of an inorganic acid mixture of at least two inorganic acids, preferably sulfuric acid and phosphoric acid, in the presence of a strong oxidizing agent at a temperature of −20° C. to 20° C., preferably −20° C. to 10° C., and more preferably −20° C. to 0° C. The ratio of the inorganic acid mixture ranges from 1:1 to 10:1 (v/v), preferably 5:1 to 10:1 (v/v), more preferably 8:1 to 10:1 (v/v), and yet more preferably about 9:1 (v/v). The sulfuric acid also acts as an intercalation agent; other intercalation agents, such as nitric acid or other strong acids, may also be used. The concentration of the sulfuric acid ranges from 80-100% mass fraction sulfuric acid, preferably 90-100% mass fraction sulfuric acid, more preferably 95-100% mass fraction sulfuric acid, and yet more preferably about 96% mass fraction sulfuric acid. Phosphoric acid is added to prevent further oxidation of the graphite. The strong oxidizing agent is preferably potassium permanganate, other oxidizing agents such as sodium permanganate, silver permanganate, calcium permanganate, barium permanganate, potassium chromate, and potassium dichromate may be used. The ratio of graphite powder and potassium permanganate ranges from 1:1 to 1:10 (w/w), preferably 1:3 to 1:8 (w/w), more preferably 1:4 to 1:7 (w/w), and yet more preferably about 1:6 (w/w). The oxidation of graphite using strong oxidizing agents introduces oxygenated functionalities in the graphite structure, expanding the layer separation and making the material hydrophilic. The reaction is carried out at a temperature range of 40-70° C., preferably between 45-60° C., under stirring, for 6-15 hours, preferably 8-14 hours, preferably 10-12 hours. The reaction is then allowed to cool to a temperature range of 10-30° C., preferably 20-30° C., for 6-15 hours, preferably 8-14 hours, preferably 10-12 hours to yield the graphite oxide. A supernatant is removed. Finally, a peroxide such as hydrogen peroxide is added to reduce residual potassium permanganate to soluble manganese sulfate ($MnSO_4$) in an acidic medium. The concentration of the hydrogen peroxide ranges from 1-50% mass fraction hydrogen peroxide, preferably 10-40% mass fraction hydrogen peroxide, more preferably 27-35% mass fraction hydrogen peroxide, and yet more preferably about 30% mass fraction hydrogen peroxide. The GTO is washed with deionized water to remove excess acid. In an embodiment, the GTO is washed one to ten times, preferably two to ten times, and more preferably three to seven times, with a strong acid and deionized water to remove unreacted metal ions. In an embodiment, the strong acid is hydrochloric acid, 10% (v/v). The graphite oxide comprises elements of carbon, oxygen, and hydrogen in variable ratios. The graphite oxide has a ratio of oxygen and carbon ranging from 1:1 to 1:10 (w/w), preferably 1:1 to 1:5 (w/w), and yet more preferably 1:2 to 1:4 (w/w). The graphite oxide includes several oxygen-containing functional groups, such as epoxy bridge functional groups, hydroxyl functional groups, and carboxyl functional groups. In some embodiments, a first carboxyl functional group may be located pairwise with a second carboxyl functional group, with a single carbon atom separating the carbon atoms to which the first carboxyl functional group and second carboxyl functional group are bonded. In some embodiments, the graphite oxide may include additional oxygen-containing functional groups, such as ketone functional groups. The oxygen-containing functional groups may be located in a plane protruding above the graphite oxide, a plane protruding below the graphite oxide, a same plane to a right of the graphite oxide, a same plane to a left of the graphite oxide, a same plane to a top of the graphite oxide, a same plane to a bottom of the graphite oxide, and a combination thereof. In some embodiments, the graphite oxide may contain a ratio of epoxy bridge functional groups and carbon atoms in a range from 1:10 to 1:25 (mol/mol), preferably 1:10 to 1:20 (mol/mol), and more preferable 1:10 to 1:15 (mol/mol). In some embodiments, the graphite oxide may contain a ratio of hydroxyl functional groups and carbon atoms in a range from 1:10 to 1:25 (mol/mol), preferably 1:10 to 1:20 (mol/mol), and more preferable 1:10 to 1:15 (mol/mol). In some embodiments, the graphite oxide may contain a ratio of carboxyl functional groups and carbon atoms in a range from 1:10 to 1:25 (mol/mol), preferably 1:15 to 1:25 (mol/mol), and more preferably 1:20 to 1:25 (mol/mol).

(ii) Converting graphite oxide to graphene oxide: The graphite oxide was dispersed in distilled water to form a graphene oxide. Graphite oxide may spontaneously disperse in basic solutions. Graphite oxide may be dispersed by sonication in polar solvents to yield monomolecular sheets of graphene oxide. The hydrophilic nature of the graphite oxide enables it to be exfoliated in water and separated into single layers upon dispersing the graphite oxide in water, thereby forming graphene oxide. The main difference between graphite oxide and graphene oxide is, thus, the number of layers. While graphite oxide is a multilayer system in a graphene oxide dispersion, a few layers of flakes and monolayer flakes can be found. The monolayer flakes are graphene oxide. The graphene oxide particles may be in the form of flakes having a longest dimension from 10 nm to 50000 nm, such as 50 to 7500 nm, 1000 nm to 5000 nm, and 1000 to 4000 nm. In some embodiments, the graphene oxide particles may be in the form of flakes having a longest dimension from 1000 nm to 45000 nm, such as 2000 to 30000 nm, 3000 to 25000 nm, and 7500 to 40000 nm. The graphene oxide was collected by filtration followed by centrifugation (800-1200, preferably 1000 rpm) and dried at 60° C. for 24 hours to obtain graphene oxide particles. In some embodiments, a centrifuge may have a rotor design of a fixed-angle centrifuge, a swinging head centrifuge, a continuous tubular centrifuge, and the like. The graphene oxide particles comprise elements of carbon, oxygen, and hydrogen in variable amounts. In some embodiments, the oxygen content of the graphene oxide particles may be from 0 to 60% oxygen atomic percentage, preferably 0 to 50% oxygen atomic percentage, more preferably 0 to 45% oxygen atomic percentage, and yet more preferably 20 to 45% oxygen atomic percentage based on total atoms of the graphene oxide particles. The graphene oxide particles thus produced include several functional groups, such as epoxy bridge functional groups, hydroxyl functional groups, and carboxyl functional groups. In some embodiments, a first carboxyl functional group may be located pairwise with a second carboxyl functional group, with a single carbon atom separating the carbon atoms to which the first carboxyl functional group and second carboxyl functional group are bonded. In some embodiments, the graphene oxide particles may include additional oxygen-containing functional groups, such as ketone functional groups. The oxygen-containing functional groups may be located in a plane protruding above the graphene oxide particles, a plane protruding below the graphene oxide particles, a same plane to a right of the graphene oxide particles, a same plane to a left of the graphene oxide particles, a same plane to a top of the graphene oxide particles, a same plane to a bottom of the graphene oxide particles, and a combination thereof. Referring to FIG. 1, a method (50) of synthesizing a hydrophilic graphene-modified polyurethane foam (GMF) membrane from graphene oxide particles is illustrated. The order in which the method 50 is described is not intended to be construed as a limitation, and any number of the described method steps may be combined in any order to implement the method 50. Additionally, individual steps may be removed or skipped from the method 50 without departing from the spirit and scope of the present disclosure.

At step 52, the method 50 includes sonicating graphene oxide in an alcohol/water mixture to form a first reaction mixture. The graphene oxide may be synthesized from waste graphite, graphite, graphene, and the like. In some embodiments, the method 50 may be adapted to include other additional carbon-based substrates (apart from graphene oxide) including, but not limited to, graphene or a derivative thereof, such as graphene oxide, reduced graphene oxide, hydrated graphene, amino-based graphene, alkylamine functionalized graphene oxide, ammonia functionalized graphene oxide, amine functionalized reduced graphene oxide, octadecylamine functionalized reduced graphene, polymer graphene aerogel, and the like. The sonication treatment, preferably ultrasonication treatment, of graphene oxide particles is a simple method to exfoliate the multilayered graphene oxide into a few-layered or single-layered graphene oxide. Ultrasonication is widely applied in the sample preparation of graphene oxide for various applications, as the single-layered graphene oxide may possess a larger active surface area than the non-sonicated graphene oxide. The sonication is carried out for 2-4 hours, preferably 2 hours. Then, the sonication is carried out by dispersing graphene oxide in an alcohol/water mixture to form a first reaction mixture. The first reaction mixture may be a suspension, a homogeneous solution, and the like. Examples of alcohol include ethanol, butanol, isopropanol, and the like. In an embodiment, the alcohol is ethanol. The volume-by-volume ratio of the alcohol to water ranges from 1:1 to 2:1.

At step 54, the method 50 includes mixing tartronic acid with the first reaction mixture and sonicating to form a second reaction mixture. In some embodiments, the weight-by-weight ratio of the graphene oxide to the tartronic acid is 1:1. In some embodiments, the tartronic acid may be added to the first reaction mixture in powder form. In other embodiments, the tartronic acid may be added to the first reaction mixture in one or more solutions and suspensions with varying solvents. In some embodiments, the method 50 may be adapted to include other additional linear dicarboxylic acids (apart from tartronic acid) including, but not limited to, oxalic acid (ethanedioic acid, $HOOC-(CH_2)_n-COOH$ wherein n=0, or $HOOC-COOH$), succinic acid (butanedioic acid, $HOOC-(CH_2)_2-COOH$), adipic acid (hexanedioic acid, $HOOC-(CH_2)_4-COOH$), suberic acid (octanedioic acid, $HOOC-(CH_2)_6-COOH$), sebacic acid (decanedioic acid, $HOOC-(CH_2)_8-COOH$), malonic acid (propanedioic acid, $HOOC-(CH_2)_1-COOH$), glutaric acid (pentanedioic acid, $HOOC-(CH_2)_3-COOH$), pimelic acid (heptanedioic acid, $HOOC-(CH_2)_5-COOH$), azelaic acid (nonanedioic acid, $HOOC-(CH_2)_7-COOH$), brassilic acid (undecanedioic acid, $HOOC-(CH_2)_9-COOH$), dodecanedioic acid ($HOOC-(CH_2)_{10}-COOH$), thapsic acid (hexadecanedioic acid, $HOOC-(CH_2)_{14}-COOH$), aspartic acid (2-aminobutanedioic acid), glutamic acid (2-aminopentanedioic acid), diaminopimelic acid ((2R,6S)-2,6-diaminoheptanedioic acid, tartaric acid (2,3-dihydroxybutanedioic acid), arabinaric acid (2,3,4-trihydroxypentanedioic acid), saccharic acid ((2S,3S,4S,5R)-2,3,4,5-tetrahydroxyhexanedioic acid), mesoxalic acid (oxopropanedioic acid), oxaloacetic acid (oxobutanedioic acid), acetonedicarboxylic acid (3-oxopentanedioic acid), the like, and mixtures thereof. Typically, dicarboxylic acids, such as tartronic acid, are added to increase the hydrophilicity/selectivity of GO. In some embodiments, the GO may be functionalized via grafting various molecules, such as amines, amino acids, silanes, or any other groups as appropriate based on the end application of the membrane, which will be obvious to a person skilled in the art.

At step 56, the method 50 includes adding a carbodiimide catalyst to the second reaction mixture and sonicating it to form a third reaction mixture comprising the functionalized product. The covalent functionalization of the graphene oxide particles was achieved using the carbodiimide catalyst. In some embodiments, the method 50 may be adapted to include other additional catalysts (apart from the carbodiimide catalyst) including, but not limited to, a homogeneous catalyst, a heterogeneous catalyst, an organic catalyst, an inorganic catalyst, a biocatalyst, an enzyme, and the like. Suitable examples of carbodiimide catalysts include 1-ethyl- 3-(3-dimethyl-aminopropyl) carbodiimide hydrochloride (EDC), 1-cyclohexyl-3-(2-morpholinyl-4-ethyl) carbodiimide methyl p-toluene sulfonate (CMC), 1-cyclohexyl-3-92-morpholioethyl)carbodiimide metho-4-toluenesulfonate (CDI), N,N'-dicyclohexylcarbodiimide (DCC), and the like. In a preferred embodiment, the carbodiimide catalyst is DCC. In some embodiments, the weight-by-weight ratio of DCC to the graphene oxide is 1:10. In some embodiments, the weight-by-weight ratio of DCC to the tartronic acid is 1:10. The third reaction mixture was sonicated for 0.5 to 2 hours, preferably 1-1.5 hours, more preferably for 1 hour. The mixture was maintained at a temperature range of 100-150° C., preferably 110-140° C., and more preferably 130° C., stirring under a nitrogen atmosphere, for 24-48 hours, preferably 24 hours, to allow for completion of the reaction. During this process, the carbodiimide catalyst facilitates coupling one or more carboxyl functional groups on the graphene oxide particles to one or more hydroxyl groups of the tartronic acid via a covalent bond. During this process, a stoichiometric amount of water is produced in the third reaction mixture. The third reaction mixture includes the functionalized product.

In a preferred embodiment, the covalent bond is between a carbon atom of the one or more carboxyl functional groups on the graphene oxide particles and an oxygen atom of a center hydroxyl group of the one or more hydroxyl groups of the tartronic acid. In some embodiments, the covalent bond is between the carbon atom of the one or more carboxyl functional groups on the graphene oxide particles and an oxygen atom of a one or more terminal hydroxyl group of the one or more hydroxyl groups of the tartronic acid. In an embodiment, the covalent bond forms an ester linkage between the graphene oxide particles and the tartronic acid. The tartronic may be located in a plane protruding above the graphene oxide particles, a plane protruding below the graphene oxide particles, a same plane to a right of the graphene oxide particles, a same plane to a left of the graphene oxide particles, a same plane to a top of the graphene oxide particles, a same plane to a bottom of the graphene oxide particles, and a combination thereof.

At step 58, the method 50 includes centrifuging the third reaction mixture to collect the functionalized product. The centrifugation was carried out 700-1200 rotations per minute (rpm), preferably 800-1000 rpm, and more preferably about 1000 rpm, for 1-3 hours, preferably 2 hours, to obtain the functionalized product. In some embodiments, the functionalized product is in the pellet. In other embodiments, the functionalized product is in the supernatant.

At step 60, the method 50 includes drying the functionalized product. The functionalized product is dried for 24-48 hours, preferably 24-36 hours, and more preferably to about 24 hours, at 50-80° C., preferably 55-75° C., and more preferably to about 60° C. in an oven, under a vacuum (preferably) to avoid any oxidation during the drying process. The functionalized product has a nanosheet structure with a thickness ranging from 1 nm to 50 nm, preferably 1 to 40 nm, and yet more preferably 1 to 20 nm.

At step 62, the method 50 includes mixing the functionalized product with polyurethane in a polar protic solvent to form a hydrophilic graphene-modified polyurethane foam membrane-containing mixture. In some embodiments, the mixing is done in the presence of a catalyst. The catalyst may be homogeneous and heterogeneous. The catalyst may be organic and inorganic. The catalyst may comprise of aluminosilicates, aluminum, titanium, vanadium, chromium, manganese, iron, cobalt, nickel, copper, zinc, ruthenium, palladium, silver, tin, tungsten, rhenium, iridium, platinum, gold, the like, and a combination thereof. In a preferred embodiment, the catalyst is a ruthenium catalyst. In some embodiments, other polymers such as cellular polystyrene, polyolefins, polyvinyl chloride, polyvinyl alcohol, polyethylene glycol, polyethylene oxide, diallyl quaternary ammonium salt polymer, chitosan, polymaleic acid, polyaspartic acid, polyepoxysuccinic acid, carboxymethyl cellulose, carboxyethyl cellulose, xanthan gum, vegetable gum, copolymers of styrene N-acrylonitrile, polyethylene foams, polyisocyanates, polyphenols, epoxy resins, and silicon resins may be used in conjunction with polyurethane. In some embodiments, a crosslinking film forming agent such as polyacrylic acid, polymethylacrylic acid, polyacrylic acid-acrylic acid ester copolymer, polymethylacrylic acid-acrylic acid ester copolymer, hydroxyl acrylic resin, amino resin, and polyurethane acrylate may be used in conjunction with polyurethane. In some embodiments, the method 50 may be adapted to include other additional polymers (apart from polyurethane) including, but not limited to, cellulose acetate, polyethylene terephthalate, polyolefins, such as polyethylene and polypropylene, and the like. In some embodiments, the polyurethane may be substituted with one or more amines, hydroxyls, amino acids, silanes, alkyl chains, or any other groups as appropriate based on the end application of the membrane, which will be obvious to a person skilled in the art. The ratio of mixing the functionalized product with the polyurethane is in the range of 1:2 to 1:5, preferably 1:2 to 1:4, and more preferably 1:3 by weight. Examples of protic solvents include water, formic acid, acetic acid, ammonia, methanol, ethanol, etc., and mixtures thereof. In some embodiments, the protic solvent is a mixture of water and alcohol. The alcohol may be ethanol, methanol, isopropanol, butanol, or combinations thereof. In some embodiments, the alcohol is ethanol. In some embodiments, the ratio of water to ethanol is 1:1 (v/v). Next, the hydrophilic graphene-modified polyurethane foam membrane-containing mixture is sonicated for 4-10 hours, preferably 5-9 hours, preferably 6-8 hours, and preferably for 8 hours. This step may be performed in an ultrasonic bath or probe.

Further, the hydrophilic graphene-modified polyurethane foam membrane-containing mixture was refluxed at a temperature range of 70-100° C., preferably 80-90° C., more preferably 90° C. for 5-10 hours, preferably 6-9 hours, and more preferably for 8 hours. The hydrophilic graphene-modified polyurethane foam membrane-containing mixture was cooled to room temperature. Finally, the hydrophilic graphene-modified polyurethane foam membrane-containing mixture was further dried to form the hydrophilic GMF membrane. One or more carbon atoms with one or more hydroxyl groups in the graphene oxide in the functionalized product are bonded covalently to a nitrogen atom of one or more amide groups in the polyurethane to form the GMF membrane. In an embodiment, one or more unsaturated carbon atoms in the functionalized product may be bonded covalently to an unsaturated nitrogen atom in the polyurethane. In some embodiments, one or more unsaturated carbon atoms in the functionalized product may be bonded covalently to an unsaturated nitrogen atom in a polyurethane linkage in the polyurethane. The one or more unsaturated carbon atoms in the functionalized product may be positioned integral and axial in the functionalized product. In an embodiment, the one or more unsaturated carbon atoms with one or more hydroxyl groups will lose the one or more hydroxyl group through the covalent bond formation between the unsaturated carbon atom and the unsaturated nitrogen atom. A stoichiometric amount of water is released when the covalent bond is being formed between one or more unsaturated carbon atoms with one or more hydroxyl groups in the functionalized product and the unsaturated nitrogen atom in the polyurethane.

The GMF membrane has a porous morphology with a pore size ranging from 100 micrometers to 800 micrometers, preferably 200 micrometers to 700 micrometers, and more preferably 300 micrometers to 500 micrometers in diameter. Various factors affect the pore size of the GMF membrane, such as choice of the polymer, degree of polymerization of the polymer, and method of preparation; these parameters may be altered based on the end application of the GMF membrane, as may be obvious to a person skilled in the art.

In some embodiments, the GMF membrane may be used for any type of filtration. In a preferred embodiment, the GMF membrane is for water treatment, such as oil-water separation. The GMF membrane is adapted for use selected from a group consisting of oil and water separation, water treatment, desalination, select ion filtration, sewage treatment, and pharmaceutical filtration. Pharmaceutical filtration may remove pharmaceutical residues in aquatic environments. In some embodiments, the GMF membrane may be for biofiltration for separation between microorganisms and water. In other embodiments, the GMF membrane may be for nuclear waste water filtration for removal of nuclear radioactive elements from nuclear waste water. The GMF membrane may be used for blood treatment such as physiological filtration to replace damaged kidney filter and blood filtration. The GMF membrane may be for separation of bioplatform molecules derived from sources such as plants, for example a grass. In some embodiments, the GMF membrane may be for separating oil from an oil-water mixture. The oil in the oil-water mixture is one or more of toluene, cyclohexane, n-hexane, dichloromethane, and waste oil. In some embodiments, the oil may be rapeseed oil, flax seed oil, soybean oil, peanut oil, corn oil, cottonseed oil, olive oil, sesame oil, rice bran oil, camellia oil, sunflower seed oil, and edible oil. In some embodiments, the oil may be dodecane, tridecane, tetradecane, pentadecane, long chain alkanes, hexadecane, benzene, xylene, mesitylene, ethylbenzene, propylbenzene, styrene, and the like. In some embodiments, the oil may be methyl methacrylate, methyl acrylate, ethyl acrylate, butyl acrylate, carbon tetrachloride, methylene dichloride, methylene diiodide, and the like. In some embodiments, the oil may be crude oil, gasoline, kerosene, diesel oil, solvent oil, lubricating oil, and the like.

Another aspect of the present disclosure describes a method for separating an oil-water mixture with the GMF membrane. The method includes wetting the membrane with water. Wetting the membrane with water may be in a range of 0.5 to 5 minutes. In some embodiments, the GMF membrane is completely wet. Wetting the membrane is a first step in preparing the membrane. Wetting the membrane pores eliminates dry pathways where contaminants, like particles, gels, or bubbles, could pass through, resulting in poor separation performance. Wetting the hydrophilic GMF membrane first allows water to saturate and prepare the membrane. Next, the method includes contacting the hydrophilic GMF membrane with an oil-water mixture. On contact, the GMF membrane will block the oil from the oil-water mixture from permeating through the membrane while selectively allowing only the water molecules to pass through the GMF membrane.

The contacting the hydrophilic GMF membrane with the oil-water mixture may be in a laboratory setting, a practical setting, and a combination thereof. These settings may be altered based on the end application of the GMF membrane, as may be obvious to a person skilled in the art. In an embodiment, the GMF membrane may be used in the laboratory in a flask fitted with a funnel. The GMF membrane may fit on the funnel. The oil-water mixture may contact the GMF membrane on the funnel and the water permeate to the flask and the oil not permeate to the flask. The flask may be one or more of a conical (Erlenmeyer) flask, a buchner flask, a volumetric flask, a round bottom flask, a Florence flask, a Kjeldahl flask, a pear-shaped flask, a retort flask, a Schlenk flask, a Straus flask, a Claisen flask, and the like. The funnel may be one or more of a filter funnel, a thistle funnel, a separating funnel, a dropping funnel, and the like. The funnel may have one or more pores, one or more holes, and a combination thereof. Membrane filtration uses a layer of semi-permeable material to separate a mixture of components, generally with the application of a driving force applied across the surface of the membrane, such as pressure and gravity. In one embodiment, the oil-water mixture may contact the GMF membrane on the funnel and the water may permeate to the flask via gravity filtration. In another embodiment, the oil-water mixture may contact the GMF membrane on the funnel and the water may permeate to the flask via vacuum filtration. The contacting the hydrophilic GMF membrane with an oil-water mixture may occur with any laboratory equipment as may be obvious to a person skilled in the art.

In an embodiment, the contacting the hydrophilic GMF membrane with the oil-water mixture may be in a practical setting such as a waste water treatment facility, a water purification facility, an oil refinery, and the like. The hydrophilic GMF membrane may be cast, dropped, printed, immobilized, and otherwise attached on a porous structure. The oil-water mixture may contact the hydrophilic GMF membrane on the porous structure and the water may permeate the hydrophilic GMF membrane and the porous structure and the oil not permeate the hydrophilic GMF membrane and the porous structure.

The membrane of the present disclosure refers to a porous structure that is capable of separating components of a heterogeneous and homogeneous fluid. The membrane contains pores, which, in the present disclosure, indicate voids allowing fluid communication between different sides of the membrane structure. More particular in use when a homogeneous or heterogeneous fluid is passed through the membrane, some components of the fluid may pass through the pores of the membrane into a permeate stream, some components of the fluid may be retained by the membrane to accumulate in a retentate, and some components of the fluid may be rejected by the membrane into a rejection stream. Membranes may be of various thickness with a homogeneous or heterogeneous structure. In some embodiments, membranes may be comprised within flat sheets and bundles of hollow fibers. Membranes may also be in various configurations including, but not limited to, spiral wound, tubular, hollow fiber, and the like, which would be obvious to a skilled person in the art. Membranes may be classified according to pore diameter including microporous membranes, mesoporous membranes, macroporous membranes, the like, and a combination thereof. Membranes may be neutral or charged. Particle transport across the membrane may be active or passive. Particle transport may be facilitated by pressure, concentration, chemical gradients of the membrane, electrical gradients of the membrane, the like, and a combination thereof.

The membrane of the present disclosure demonstrated a separation efficiency of oil and water of at least 96% by mass of water before the contacting and after the contacting the hydrophilic GMF membrane with the oil-water mixture. The water flux with the membrane of the present disclosure in separating an oil-water mixture was in a range of 30,000 L $m^{-2}$ $h^{-1}$ to 31,000 L $m^{-2}$ $h^{-1}$, preferably 30,250 L $m^{-2}$ $h^{-1}$ to 31,000 L $m^{-2}$ $h^{-1}$, and more preferably 30,500 L $m^{-2}$ $h^{-1}$ to 31,000 L $m^{-2}$ $h^{-1}$ in a range of 1 to 50 cycles. The water flux was in the range of 30,900 L $m^{-2}$ $h^{-1}$ to 31,000 L $m^{-2}$ $h^{-1}$ in the range of 1 to 5 cycles. The water flux decreased from about 30,900 L $m^{-2}$ $h^{-1}$ to about 30,500 L $m^{-2}$ $h^{-1}$ in the range of 5 to 20 cycles. The water flux stayed at about 30,500 L $m^{-2}$ $h^{-1}$ in the range of 20 to 50 cycles. The membrane prepared by the method of the present disclosure has a high-water adsorption capacity of at least 20 g/g, preferably in a range of 20-40 g/g. The increased water absorption capacity is due to the presence of numerous hydrophilic groups present on the membrane. The hydrophilic graphene-modified polyurethane foam membrane has an oil contact angle from 145° to 160°, preferably 150° to 160°, and more preferably 1500 to 1550.

EXAMPLES

The following examples demonstrate the graphene-modified polyurethane foam (GMF) membrane as described herein. The examples are provided solely for illustration and are not to be construed as limitations of the present disclosure, as many variations thereof are possible without departing from the spirit and scope of the present disclosure.

Example 1: Materials $KMnO_4$, $H_2SO_4$ (96% w/w), $H_3PO_4$ (85% w/w), $H_2O_2$ (30%), urea, ammonium sulfate, and ammonium phosphate were purchased from Sigma Aldrich. Graphite powder, commercial polyurethane foam (PUF), and lubricating oil were collected. Cellulose (CE), acrylamide (AM), sodium hydroxide (NaOH), nitric acid ($HNO_3$), and ammonium ceric sulfate (ACeS), were purchased from Fluka and used as received. Potassium persulfate ($K_2S_2O_8$), nitrogen, toluene, n-hexane, cyclohexane, dichloromethane, chloroform, and ethanol were obtained from Sigma Aldrich. Distillation water was obtained from an in-house built distillation unit.

Example 2: Synthesis of Graphene Oxide (GO)

Figure 2:
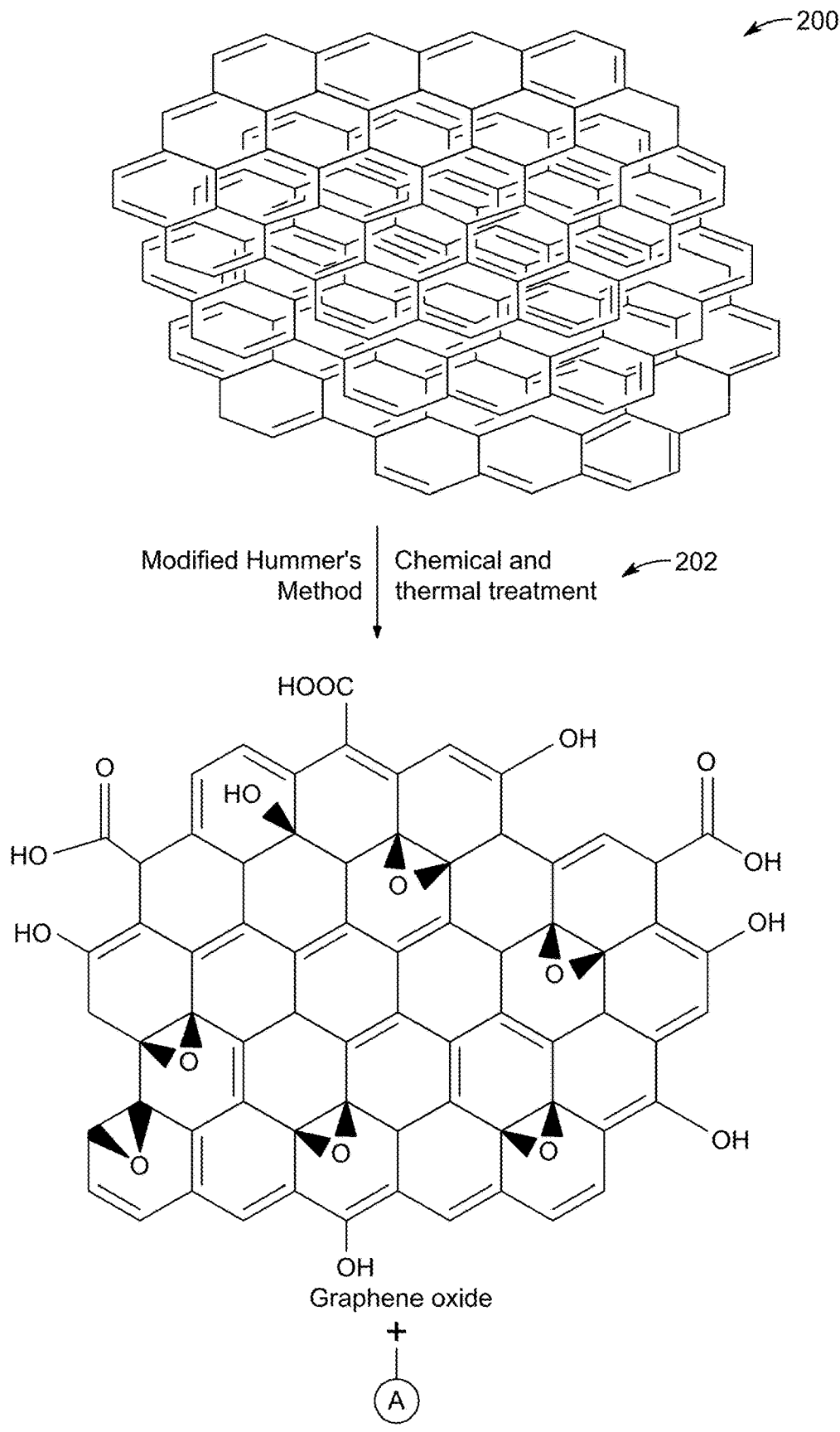
FIG. 2 is a schematic illustration depicting a method for preparing functionalized graphene oxide, according to certain embodiments.
Figure 2:
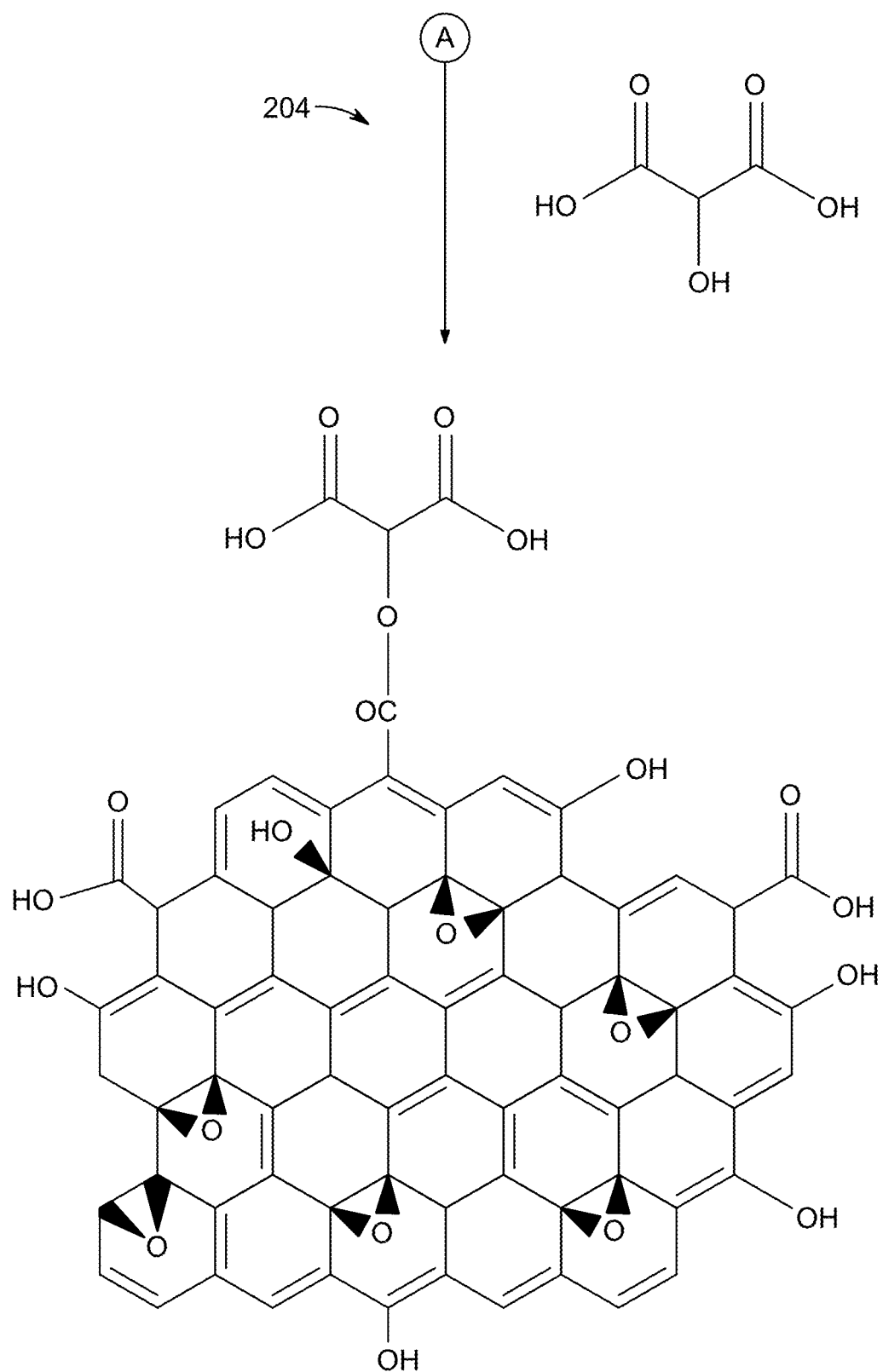

FIG. 2 is a schematic illustration depicting a method (200) for preparing functionalized graphene oxide. At step 202, the method 200 includes synthesizing GO by a modified Hummers' method using waste graphite powder. The waste graphite is subjected to chemical and thermal treatment to obtain the GO. In this method 200, first, 360 mL of ice-cold $H_2SO_4$ (96% w/w) and 40 mL of $H_3PO_4$ were combined with 3 g of graphite powder and 18 g of $KMnO_4$ while being stirred. The mixture was heated for 12 hours at 50° C. while stirring. The mixture was then placed into a 400 mL deionized water ice bath and 3 mL of $H_2O_2$ (30% w/w) was added to the mixture. It was then allowed to cool at room temperature for the next day. The finished product was left to settle overnight and the supernatant was removed. After that, it was repeatedly washed in water to remove any excess acid. After three rounds of washing with 10% (w/w) HCl and distilled water to remove unreacted metal ions, the remaining material was finally dissolved in deionized water, where unreacted graphite precipitated, and the GO dissolved. The dissolved GO was decanted, spun at 1000 rpm for two hours, and dried, to obtain the graphene oxide.

Example 3: Functionalization of GO 1 g of graphene oxide was dispersed in 50 mL ethanol and 30 mL water. First, it was kept under ultrasonication for 2 hours. Then, 1 g tartronic acid was added, and the mixture was sonicated for 1 hour (204). After that, 0.1 g of N,N'-Dicyclohexylcarbodiimide (DCC or DCCD) catalyst was introduced, and the reaction mixture was sonicated for 1 hour more. Next, the resultant dispersion was kept at 130° C. under stirring and under nitrogen for one day to allow the reaction to complete. After that, the product was collected using centrifuging at 1000 rpm for 2 hours. Finally, the resultant modified graphene was allowed to dry for one day at 60° C. under a vacuum (FIG. 2).

Example 4: Synthesis of Graphene-Modified Polyurethane Foam (GMF)

Figure 3:
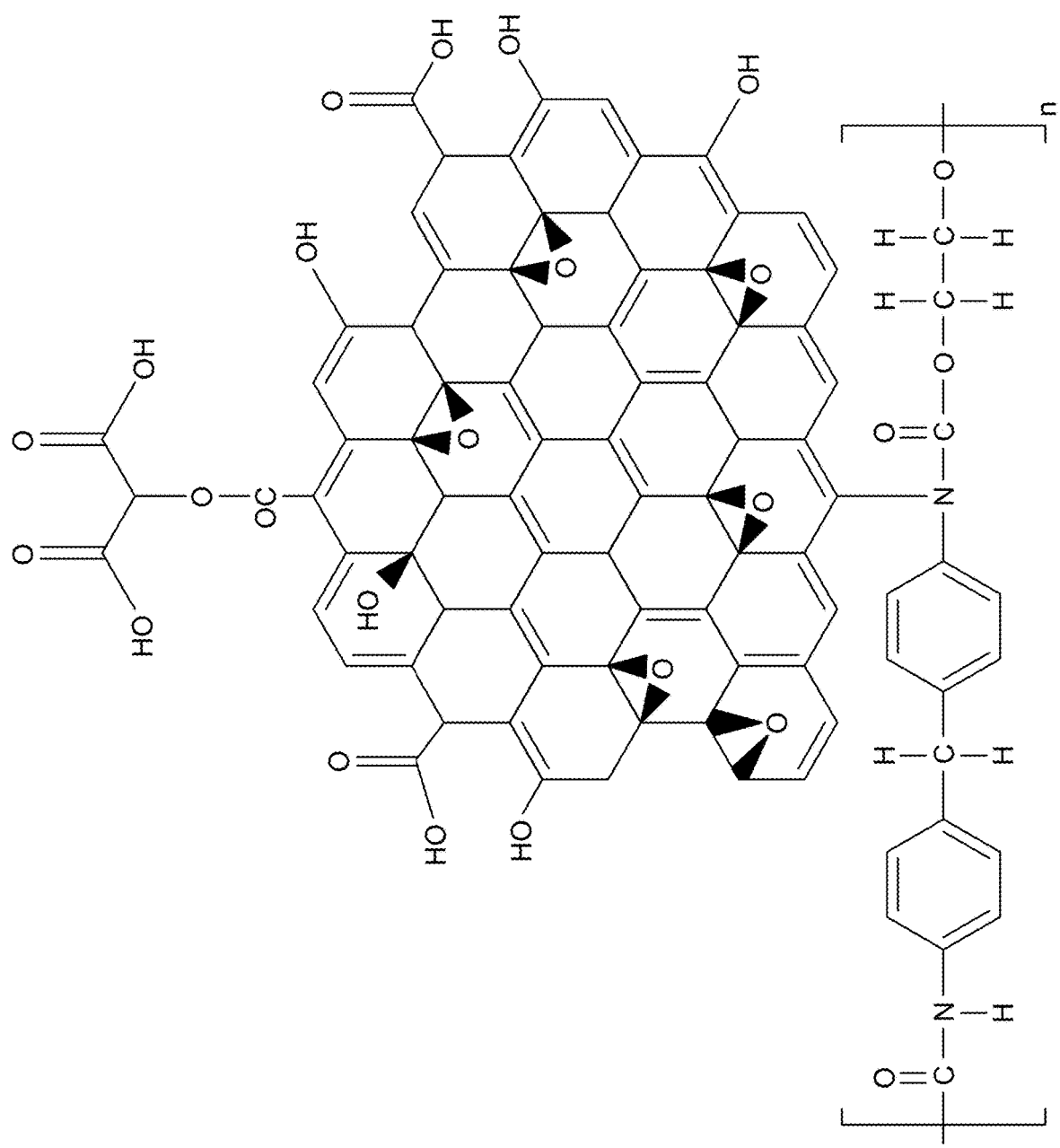
FIG. 3 depicts a chemical structure of the GMF membrane, according to certain embodiments.

About 3 g of the polyurethane foams were added into a solution containing 1 g of the modified graphene dispersed in 100 mL ethanol and 100 mL water. The components were kept under sonication for 8 hours. After that, the components were transferred into the reflux system and kept under reflux at 90° C. for 8 hours. After that, the system was allowed to cool to room temperature. After that, the graphene-modified polyurethane foam (GMF) was dried using a freeze dryer for 24 hours. The modified foams were then collected, characterized, and used for separation. The chemical structure of the GMF is depicted in FIG. 3.

Example 5: Water/Oil Separation Process

The prepared GMF was used and evaluated for its water/oil separation performance. First, a piece of GMF was completely wet using water before performing the separation tests. Owing to the water film's high repelling qualities and the hydrophilic characteristic property of the prepared GMF, the water permeated through the GMF to the flask below while the oil remained above the GMF. The water was then collected and weighed to determine the water absorption capacity, separation efficiency, and flux. Finally, the mixture of oil and water was allowed to contact the GMF until all the water had been collected.

The water absorption capacity (Q) was calculated from the weight ratio as follows:

$$Q = \frac{w_i - w_0}{w_0}, (1 \le i \le 50) \tag{1}$$

where $W_i$ refers to the weight of the GMF after the oil/water separation test, and $W_0$ refers to the weight of the fresh GMF before the oil/water separation test. The weight $W_i$ of the GMF absorbing water was determined immediately after the separation test.

Gravity-driven separation efficiency and flux are calculated as follows:

$$\text{Separation efficiency (\%)} = \frac{M}{M_0} \times 100\% \tag{2}$$

$$\text{Flux} = \frac{V}{A \times \Delta t} \tag{3}$$

where $M_0$ and M denote the mass of water before and after separation, respectively. V is the volume of water permeating the GMF, $\Delta t$ is the period of permeation, and A is the area of the GMF. Each defined value was calculated.

Example 6: Characterization

Figure 4A:
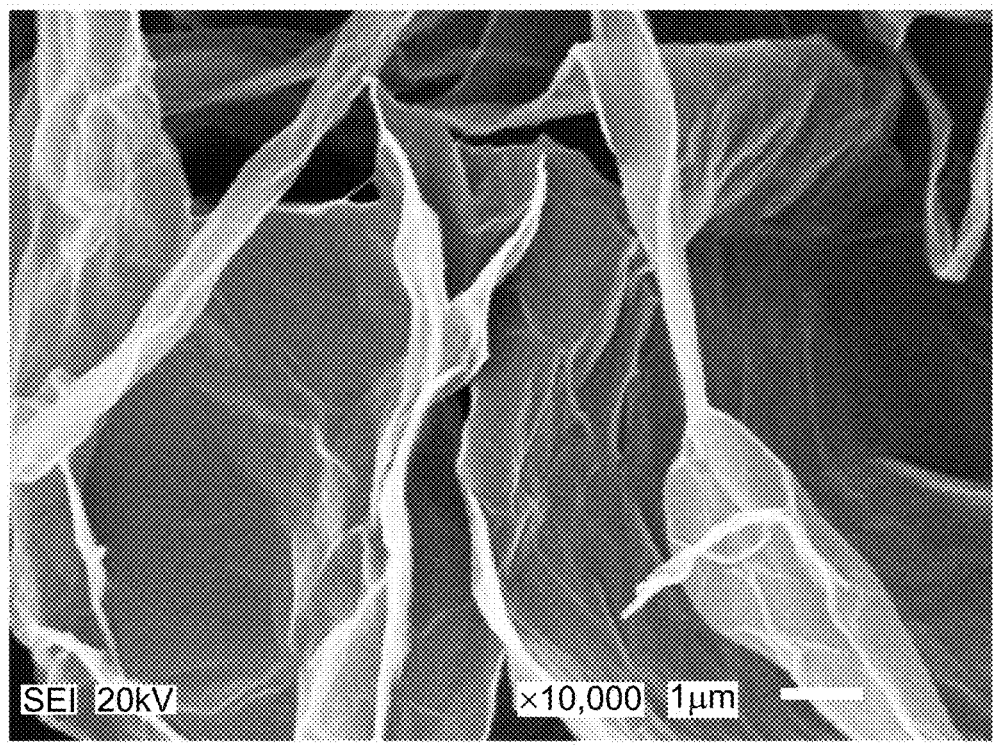
FIG. 4A is a scanning electron microscopic (SEM) image of the functionalized graphene oxide, according to certain embodiments.
Figure 4B:
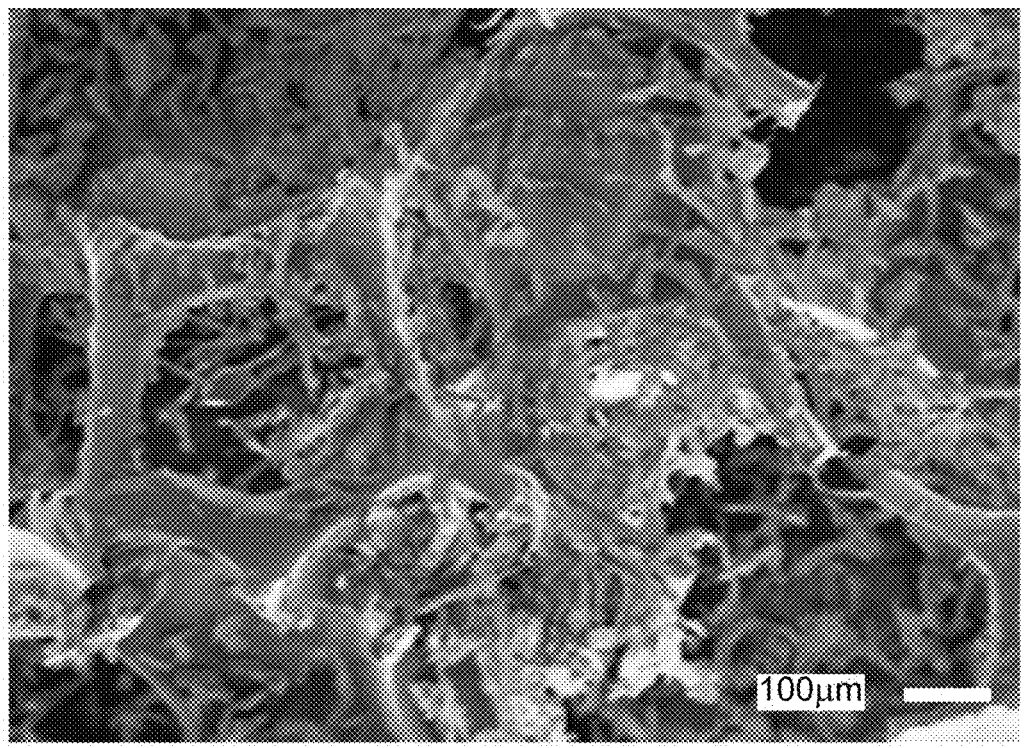
FIG. 4B is a SEM image of the GMF membrane, according to certain embodiments.

Scanning electron microscopy (SEM) images were used to analyze the surface morphology of the prepared functionalized graphene (FIG. 4A) and GMF (FIG. 4B). The SEM image of the functionalized graphene indicates sheets like the structure of the graphene. After impending the modified graphene into the polyurethane, the SEM images show the pores structure of the prepared GMF.

Figure 5A:
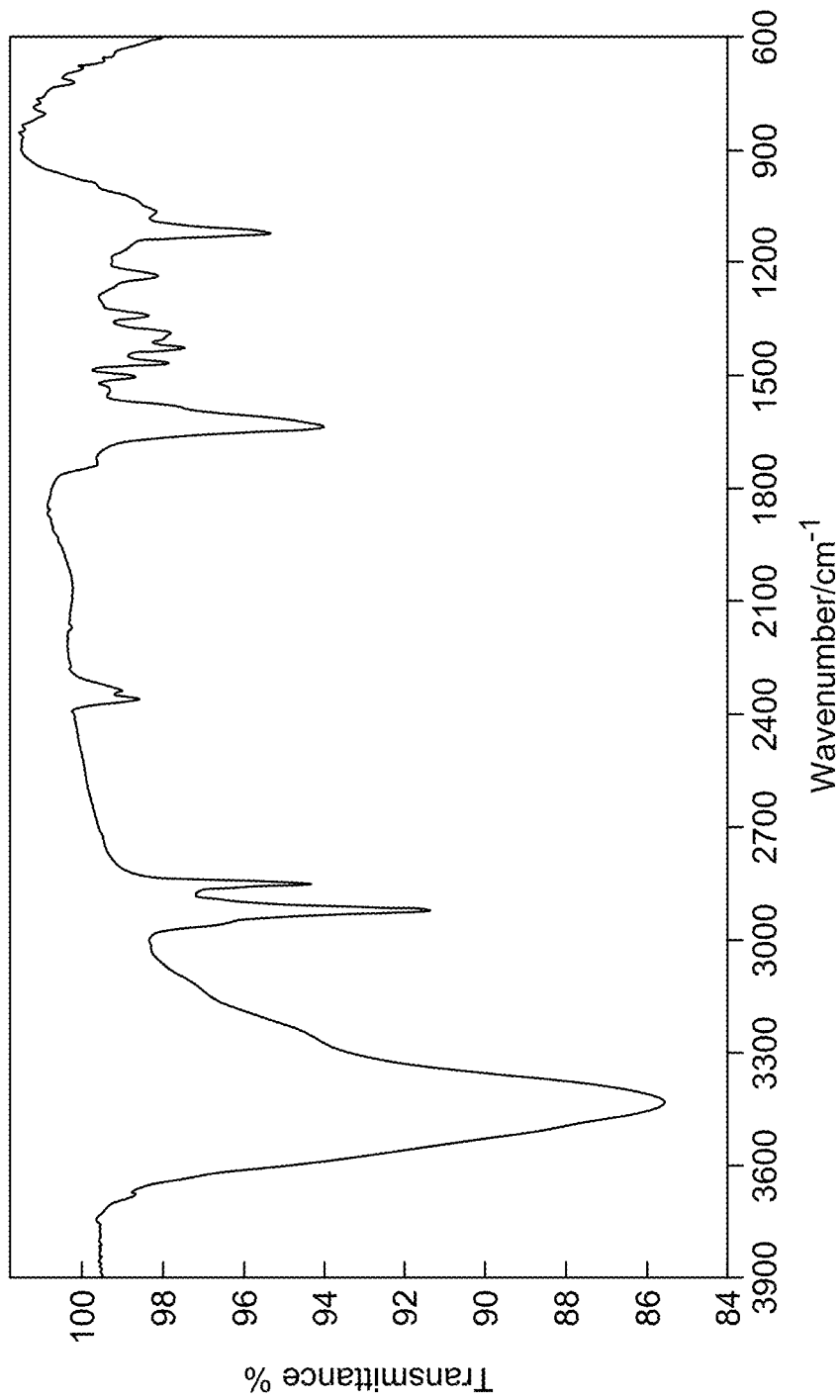
FIG. 5A is a Fourier Transform Infrared (FTIR) spectra of the GMF, according to certain embodiments.

The chemical structures of the original GMF were identified using FTIR (FIG. 5A). The spectrum of GMF displayed significant bands at 3650, 3260, 1658, 1380, 1144, and 1091 cm$^{-1}$, which were attributed to the N—H stretching vibration, O—H stretching vibration, C=C stretching vibration, C—H bending vibration, and C—O bending vibration. The appearance of the O—H band indicated the successful dispersion of cellulose into the original polyurethane foam. The two bands at 2977 and 2895 cm$^{-1}$ indicated the C—H stretching vibration. Moreover, the bands centered at 957 and 817 cm$^{-1}$ were ascribed to the benzene ring's bending vibration.

Figure 5B:
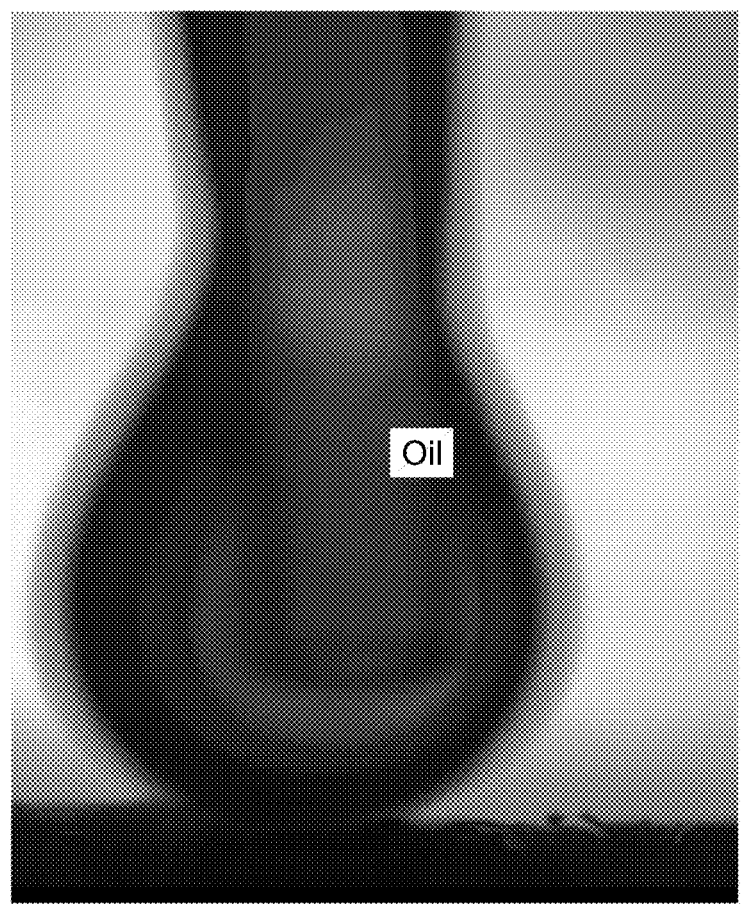
FIG. 5B is an oil contact angle of the GMF membrane, according to certain embodiments.

The oil contact angle was measured on the prepared GMF. FIG. 5B displays the image of the oil drop contact with the surface of the prepared GMF. The model oil was chloroform. The oil contact angle was found to be 152° for the prepared GMF, indicating the material's high hydrophobicity.

Absorption Capacity (Q) and Separation Efficiency (%)

Figure 6A:
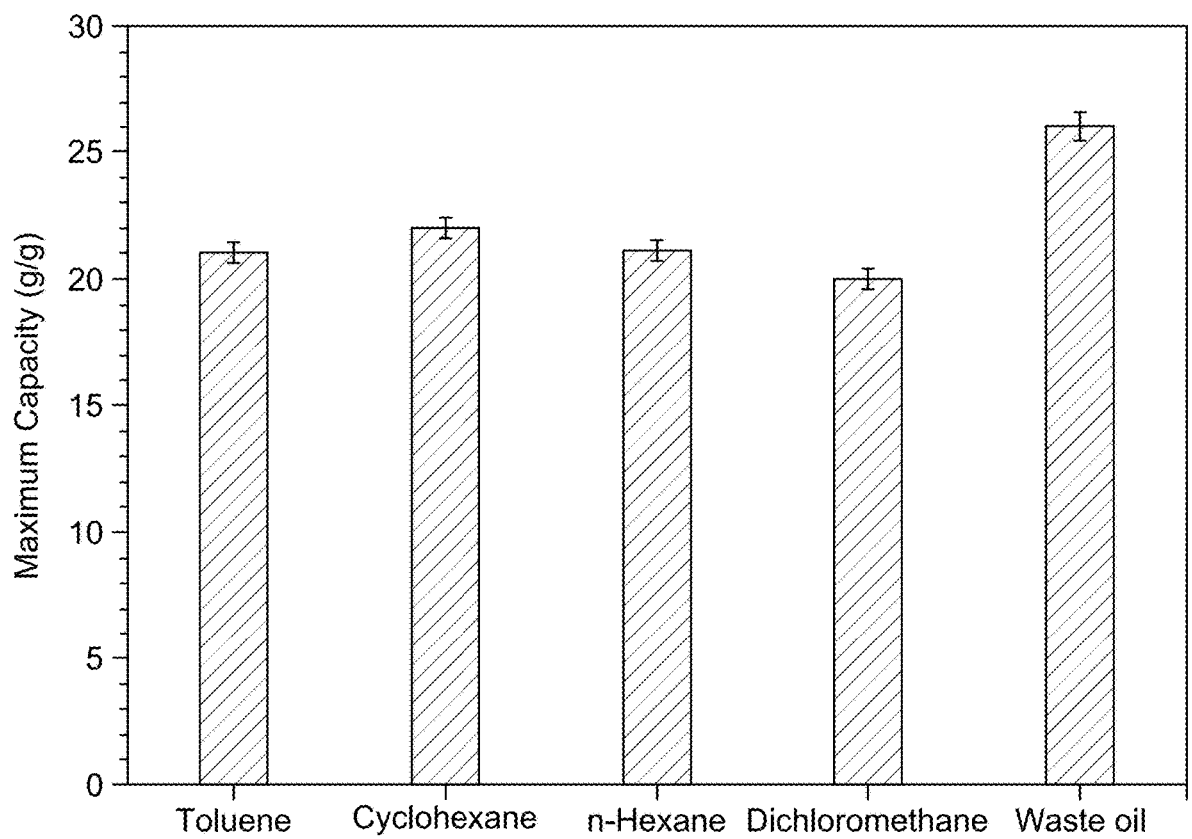
FIG. 6A is a plot depicting the absorption capacity (Q) of the GMF membrane, according to certain embodiments.
Figure 6B:
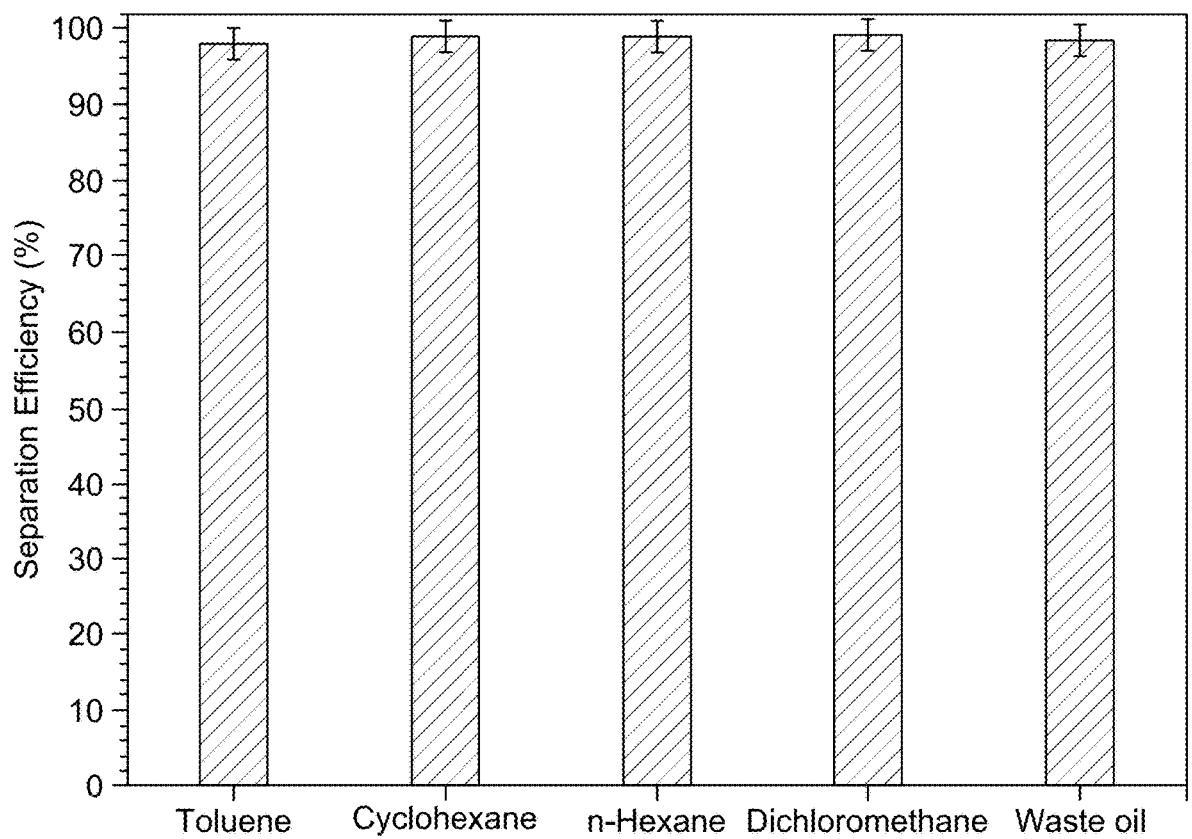
FIG. 6B is a plot depicting the separation efficiency (%) of the GMF membrane, according to certain embodiments.

A superhydrophilic surface may endow a material with remarkable superoleophobicity in water since the water layer trapped in the micro- or nano-scale structures induces the water-oil-solid interface into the Cassie-Baxter state. GMF performed better in terms of anti-oil adhesion underwater. The oil droplet was forced to appropriately contact the material's surface and then extracted. During the removal, no adhesion was detected, indicating a very low oil adhesion force. Absorption capacity (Q) separation efficiency (%) of the prepared GMF toward several pollutants (toluene, cyclohexane, n-hexane, dichloromethane, and waste oil) are shown in FIG. 6A and FIG. 6B, respectively. The separation efficiency was found to be greater than 95% for all the tested oils (FIG. 6A). The absorption capacity was found to be maximum for waste oil (greater than 25 g/g), among other tested oils, as can be observed from FIG. 6B. The results indicated high absorption capacity and separation efficiency.

Flux Using the GMF.

Figure 7A:
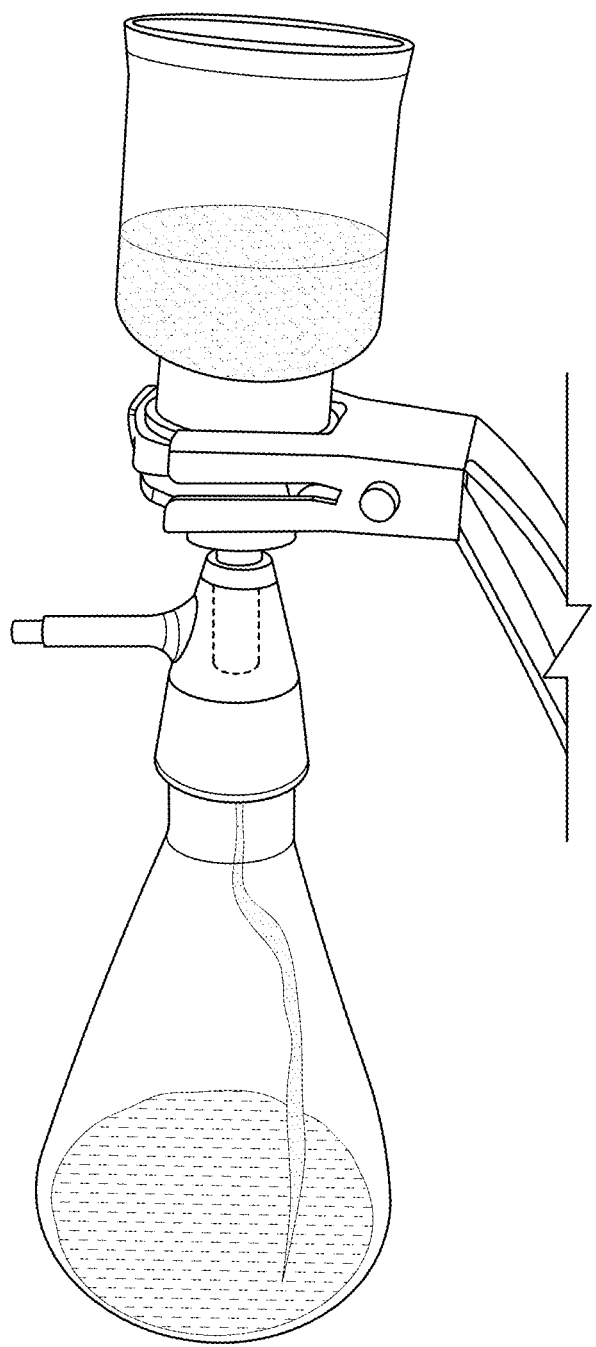
FIG. 7A is a photographic image depicting an oil-water separation with the GMF membrane, according to certain embodiments.
Figure 7B:
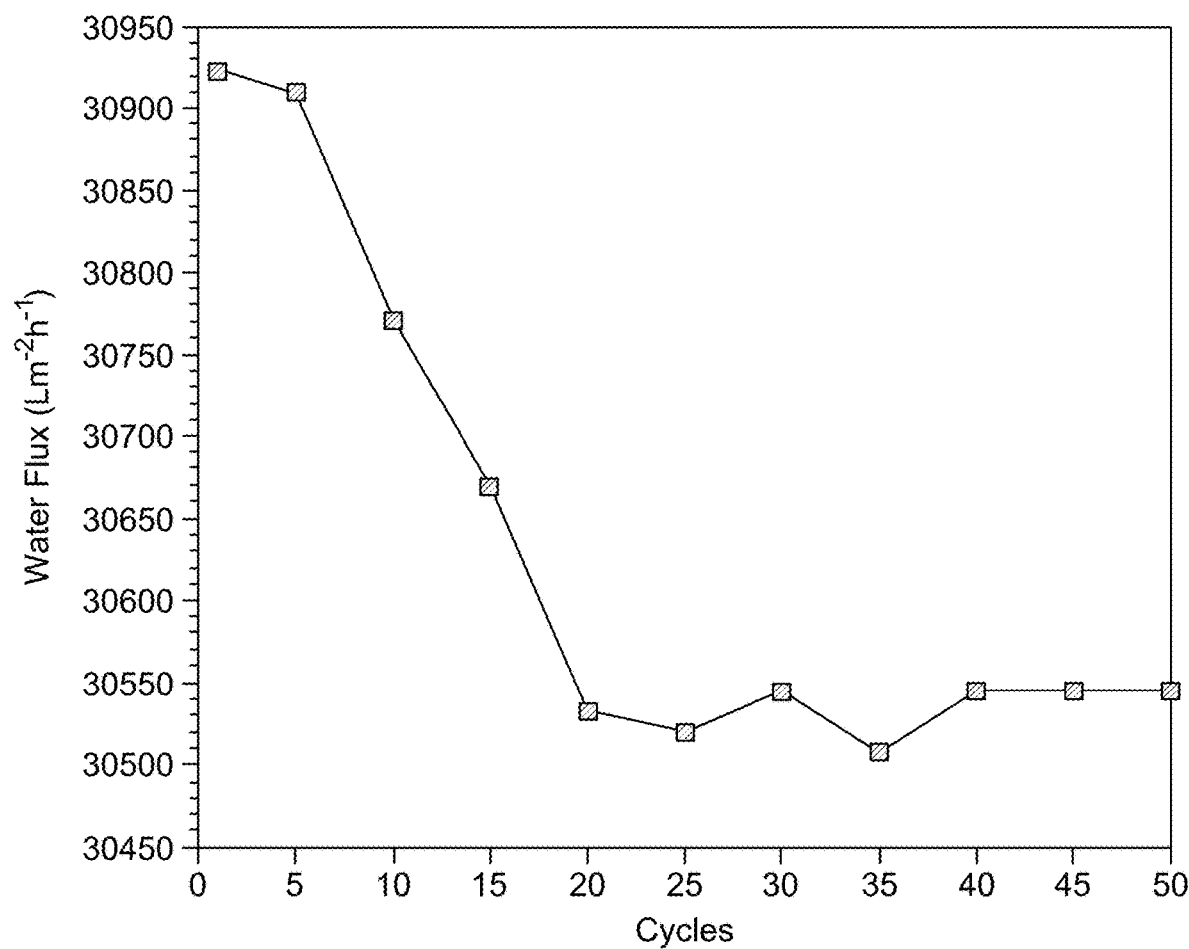
FIG. 7B is a plot depicting the water flux of the GMF membrane, according to certain embodiments.

For oil/water separation, the oil resistance and repellency function are vital factors for excellent performance. Before the oil/water separation test, the GMF was allowed to wet in water. When the oil-water mixture was poured into GMF, water immediately permeated to the flask. At the same time, oil (different compounds of toluene, cyclohexane, n-hexane, dichloromethane, and waste oil) was blocked on the surface (FIG. 7A). This can be attributed to the large number of super-hydrophilic functional groups that were provided by modified graphene. Separation efficiency was also above 96% for all components (toluene, cyclohexane, n-hexane, dichloromethane, and waste oil). These high separation efficiencies are advantageous in the purification processes in which the elimination of oils and organic contaminants from water occurs. The water flux was found to be in a range of 30,925 L m$^{-2}$ h$^{-1}$ to 30,500 L m$^{-2}$ h$^{-1}$ for 1 to 50 cycles (FIG. 7B).

Numerous modifications and variations of the present disclosure are possible in light of the above teachings. It is therefore to be understood that within the scope of the appended claims, the invention may be practiced otherwise than as specifically described herein.

The invention claimed is:

1. A method for synthesizing a hydrophilic graphene-modified polyurethane foam membrane, comprising:
functionalizing graphene oxide particles with tartronic acid to form a functionalized product having a hydrophilic functional group; and
reacting the functionalized product with a polyurethane to form the hydrophilic graphene-modified polyurethane foam membrane,
wherein the hydrophilic graphene-modified polyurethane foam membrane has a water adsorption capacity of at least 20 g/g.

2. The method of claim 1, wherein functionalizing graphene oxide particles with tartronic acid comprises:
sonicating graphene oxide in an alcohol/water mixture to form a first reaction mixture;
mixing tartronic acid with the first reaction mixture and sonicating to form a second reaction mixture;
adding a carbodiimide catalyst to the second reaction mixture and sonicating to form a third reaction mixture comprising the functionalized product;
centrifuging the third reaction mixture to collect the functionalized product; and
drying the functionalized product.

3. The method of claim 2, wherein the sonicating to form the first reaction mixture occurs for at least two hours.

4. The method of claim 2, wherein the carbodiimide is N,N'-dicyclohexylcarbodiimide.

5. The method of claim 2, wherein the drying occurs for at least twenty-four hours at 60° C. under a vacuum.

6. The method of claim 1, wherein the reacting the functionalized product with polyurethane comprises:
mixing the functionalized product with the polyurethane in a polar protic solvent to form a mixture;
sonicating the mixture;
refluxing the mixture; and
drying the mixture to form the hydrophilic graphene-modified polyurethane foam membrane.

7. The method of claim 1, wherein the ratio of the functionalized product with the polyurethane is in the range of 1:2 to 1:5 by weight.

8. The method of claim 1, further comprising
synthesizing the graphene oxide particles by oxidizing a waste graphite powder, wherein at least 95% by weight of the graphite in the graphene oxide particles is from the waste graphite powder.

9. The method of claim 1, wherein the graphene oxide particles comprise epoxy functional groups, hydroxyl functional groups, and carboxyl functional groups.

10. The method of claim 1, wherein the graphene oxide particles comprises one or more carboxyl functional groups that are covalently bonded to one or more hydroxyl groups of the tartronic acid.

11. The method of claim 1, wherein the functionalized product has a nanosheet structure.

12. The method of claim 1, wherein one or more carbon atoms in the graphene oxide in the functionalized product is bonded covalently to one or more amides in the polyurethane.

13. The method of claim 1, wherein the hydrophilic graphene-modified polyurethane foam membrane has a porous morphology with pores ranging in size from 100 micrometers to 800 micrometers in diameter.

14. The method of claim 1, wherein the hydrophilic graphene-modified polyurethane foam membrane has an oil contact angle from 145° to 160°.

15. The method of claim 1, further comprising:
contacting the hydrophilic graphene-modified polyurethane foam membrane with an oil-water mixture to permeate the water from the oil-water mixture through the hydrophilic graphene-modified polyurethane foam membrane and block the oil from the oil-water mixture from permeating through the hydrophilic graphene-modified polyurethane foam membrane.

16. The method of claim 15, wherein contacting the hydrophilic graphene-modified polyurethane foam membrane with the oil-water mixture results in a separation efficiency of oil and water of at least 96%.

17. The method of claim 15, wherein contacting the hydrophilic graphene-modified polyurethane foam membrane with the oil-water mixture results in a flux from 30,925 L m$^{-2}$ h$^{-1}$ to 30,500 L m$^{-2}$ h$^{-1}$ in a range of 1 to 50 cycles.

18. The method of claim 15, further comprising:
 wetting the hydrophilic graphene-modified polyurethane foam membrane with water before contacting the hydrophilic graphene-modified polyurethane foam membrane with the oil-water mixture.

19. The method of claim 15, wherein the oil in the oil-water mixture is one or more of toluene, cyclohexane, n-hexane, dichloromethane, and waste oil.

20. The method of claim 1, wherein the hydrophilic graphene-modified polyurethane foam membrane is adapted for a use selected from the use group consisting of oil and water separation, water treatment, desalination, and pharmaceutical filtration.

* * * * *